United States Patent [19]

Melindo et al.

[11] 4,185,172
[45] Jan. 22, 1980

[54] METHOD OF AND MEANS FOR DETECTING DIGITIZED MULTI FREQUENCY-CODED SIGNALS

[75] Inventors: Flavio Melindo; Renato Rocci, both of Turin, Italy

[73] Assignee: Cselt - Centro Studi e Laboratori Telecomunicazioni S.p.A., Turin, Italy

[21] Appl. No.: 906,857

[22] Filed: May 17, 1978

Related U.S. Application Data

[63] Continuation-in-part of Ser. No. 861,517, Dec. 16, 1977, abandoned.

[30] Foreign Application Priority Data

Dec. 17, 1976 [IT] Italy ............................ 70007 A/76

[51] Int. Cl.² .............................................. H04Q 11/00
[52] U.S. Cl. ........................ 179/15 BY; 179/84 VF; 364/728
[58] Field of Search ......... 179/15 BY, 15 BF, 84 VF, 179/15 AT; 364/728; 343/100 CL; 340/171 R

[56] References Cited

U.S. PATENT DOCUMENTS

| | | | |
|---|---|---|---|
| 3,976,843 | 8/1976 | Buchner et al. | 179/15 BY |
| 4,001,521 | 1/1977 | Fukata et al. | 179/84 VF |
| 4,025,730 | 5/1977 | Sawai | 179/84 VF |

FOREIGN PATENT DOCUMENTS

| | | |
|---|---|---|
| 2334566 | 2/1974 | Fed. Rep. of Germany . |
| 2556354 | 6/1976 | Fed. Rep. of Germany . |
| 2515769 | 10/1976 | Fed. Rep. of Germany . |
| 2195797 | 3/1974 | France . |

OTHER PUBLICATIONS

Claasen et al., "A Digital Receiver for Tone Detection Applications", IEEE Transactions on Communications, vol. Com-24, No. 12, Dec. 1976, pp. 1291–1300.

C. R. Baugh, "Design and Performance of a Digital Multifrequency Receiver", IEEE Transactions on Communications, Jun. 1977, pp. 608–615.

*Primary Examiner*—Bernard Konick
*Assistant Examiner*—Joseph A. Popek
*Attorney, Agent, or Firm*—Karl F. Ross

[57] ABSTRACT

Digitized samples of switching or supervisory signals in the form of specific frequency pairs, selected from n predetermined signaling frequencies, are received at a PCM terminal of a telephone exchange and fed to n frequency correlators, one for each signaling frequency used in the system, where the samples are multiplied by a sine function and a cosine function of the respective signaling frequency and the two products are integrated and vectorially added to form a resulting binary signal. The absolute value of the incoming-signal sample in each PCM time slot is multiplied in a pair of pseudo-correlators with two fixed values of approximately equal magnitude but opposite sign. A microcomputer compares the output signals of the several frequency correlators with a fixed threshold, or with an adaptive threshold derived from the output of one of the pseudo-correlaors if that threshold surpasses the fixed one. If the threshold used as a reference is exceeded for a predetermined length of time, the output signal is recognized as being a true signaling pulse. A significant discrepancy between the absolute magnitudes of the two pseudo-correlator outputs, detected by the microcomputer, gives rise to an alarm signal indicative of a malfunction. The several frequency correlators and pseudo-correlators can all be constituted by a single circuit component to which the various signaling frequencies are successively applied in any time slot assigned to an incoming signaling channel.

10 Claims, 5 Drawing Figures

METHOD OF AND MEANS FOR DETECTING DIGITIZED MULTI FREQUENCY-CODED SIGNALS

CROSS-REFERENCE TO RELATED APPLICATION

This a continuation-in-part of our copending application Ser. No. 861,517 filed 16 Dec. 1977 and now abandoned.

FIELD OF THE INVENTION

Our present invention relates to a method of and means for detecting switching or supervisory signals, such as call-number digits, received at an exchange in multifrequency-coded from, i.e. as combinations of m out of n predetermined frequencies.

BACKGROUND OF THE INVENTION

In telephone or other telecommunication systems, especially those partially operating by pulse-code modulation (PCM), problems arise in the conversion of analog signals, arriving at an exchange from stations not operating in the PCM mode, into digital form for handling by the processor of the exchange. If the analog signals are numerical pulses of the aforementioned multifrequency-coded type, their evaluation in the available time slots involves a large number of operations such as threshold determinations to be performed in each signaling channel. The complexity of the equipment heretofore needed for this purpose has limited the extent to which time-division multiplexing (TDM) is available at such an exchange. An alternative sometimes resorted to in the past, i.e. the digitization of incoming analog signals for switching purposes and their subsequent reconversion to analog form for evaluation, entails even more complex circuitry.

OBJECTS OF THE INVENTION

An object of our present invention, therefore, is to provide a more expeditious method of detecting such multifrequency-coded signals, particularly at an exchange of a telecommunication system operating in the PCM/TDM mode.

A related object is to provide an improved signal receiver implementing this method.

SUMMARY OF THE INVENTION

In accordance with our present invention, digitized samples of incoming signals to be detected are correlated with all n signaling frequencies to produce as many resulting signals which are then evaluated to determine those m signals whose magnitudes surpass a reference level for at least a predetermined minimum time interval. The magnitudes attained by these m signals at the end of that time interval are stored along with a commencement code identifying them, whereupon the stored magnitudes as well as the reference level are compared in successive sampling cycles with the instantaneous magnitudes of the m signals to determine the instants when each of these magnitudes drops below either the reference level or a predetermined fraction of the corresponding stored magnitude, whichever is higher; at that point a termination code is registered. Thus, a processor controlling switching operations at the exchange has available all the information required, namely the identity of the m signaling frequencies involved as well as the beginning and the end of the effective duration of the signal pulse represented by this particular frequency combination.

The correlation of the incoming-signal samples with the n signaling frequencies generally involves the multiplication of each signal sample with locally generated digital samples of n oscillations corresponding to these frequencies, specifically samples of a sine function and a cosine function thereof. The resulting digital products are separately integrated, over a succession of sampling cycles, and the products so integrated are vectorially combined.

Pursuant to another feature of our invention, the reference level used in the evaluation of the several resulting signals is chosen as the larger one of two thresholds, i.e. a fixed threshold and an adaptive threshold varying with the mean of the absolute value of the digitized incoming signal sample, generally as a predetermined fraction of that mean value. This ensures that each correlated output signal will have a magnitude well above the adaptive threshold if the component of the incoming signal corresponding to the correlating frequency makes a major contribution to the overall signal level. The adaptive threshold may be derived from a pseudo-correlator operating on an absolute signal value available at the output of a transformation circuit which, like the actual frequency-correlating means used in the aforedescribed operations, receives the incoming-signal samples from input means such as a PCM terminal. The pseudo-correlator differs from the frequency-correlating means in that its multiplication factor is a fixed value rather than a trigonometric function.

In principle, the frequency-correlating means used in a signal receiver according to our invention may comprise n physically distinct correlators to which the digitized signal samples are fed in parallel for binary multiplication by sine and cosine functions of respective signal frequencies, with low-pass filtering and subsequent vectorial addition of the two products obtained in each correlator. According to a more particular feature of our invention, however, we subdivide each PCM time slot into a number of phases in which one and the same circuit component is used to perform the aforedescribed operations with all the n signal frequencies in succession and also acts as the above-mentioned pseudo-correlator by multiplying the absolute value of the incoming signal—averaged over a number of consecutive PCM frames—by a fixed value. For a proper testing of the performance of this circuit compenent, we prefer to carry out the last-mentioned procedure twice, using fixed values of substantially equal magnitudes but of opposite signs as the multipliers.

BRIEF DESCRIPTION OF THE DRAWING

The above and other features of our invention will now be described in detail with reference to the accompanying drawing in which.

SPECIFIC DESCRIPTION

Figure 1:
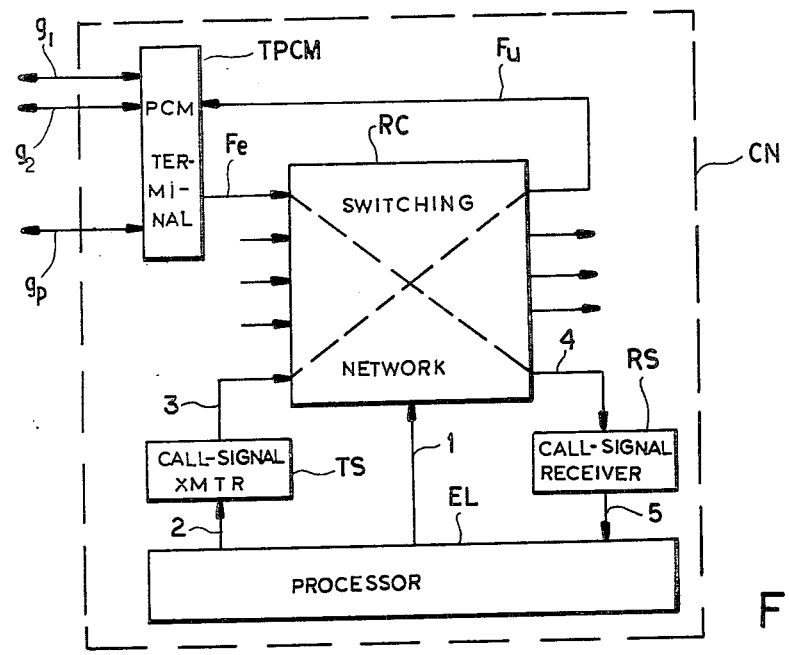
FIG. 1 is a block diagram of a PCM exchange equipped with a signal receiver according to our invention.

In FIG. 1 we have shown a central office or exchange CN of a telephone system operating in the PCM/TDM mode and communicating with other exchanges via two-way links $g_1, g_2, \ldots g_p$. These links are connected to a PCM terminal TPCM of conventional type in which incoming signals are cyclically sampled and the samples are quantized. The terminal also performs the reverse operation of converting outgoing PCM codes into analog signals to be transmitted over these same links to their respective destinations.

At RC we have shown a conventional digital switching network which has an input line Fe and an output line Fu connected to terminal TPCM. Further inputs and outputs of network RC serve for the exchange of signal codes with other PCM stations and are not relevant to the present invention.

A conventional digital processor EL controls the switching operations of network RC via a lead 1 and works into an input 2 of a signal tranmitter TS which feeds an input 3 of network RC; an output 4 of that network extends to a signal receiver RS connected to an input 5 of processor EL. Transmitter TS and receiver RS handle switching or supervisory signals, e.g. the digits of a call number, conforming to a multifrequency code of the $\binom{n}{m}$ type, specifically two frequencies out of six in accordance with CCITT Code R2.

Transmitter TS may be of a type described, for example, in a paper by J. Tierney, C. M. Rader and B. Gold entitled "A Digital Frequency Synthesizer", IEEE Transactions on Audio and Electroacoustics, Vol. AU-19, No. 1, March 1971.

Receiver RS, designed to detect incoming coded signals in any of the PCM channels assigned to links $g_1-g_p$, is the subject matter of our present invention and will be described hereinafter in detail with reference to FIG. 2.

As shown in the latter Figure, input line 4 emanating from switching network RC has n parallel branches 4(1), ... 4(i), ... 4(n) as well as a further branch 4(x). Branches 4(1)–4(n) extend to respective frequency correlators $CR_1, \ldots CR_i, \ldots CR_n$, of identical construction, with output leads 6(1), ... 6(i), ... 6(n) terminating at a read/write memory MEa. This memory coacts with a microcomputer MC receiving, on an output multiple 13, the data stored in a memory cell identified through an address multiple 14. Microcomputer MC works via an output line 15 into another read/write memory MEb which feeds the processor EL (FIG. 1) upon being addressed by it via a multiple 16.

Branch line 4(x) leads to a transformation circuit MAG which, by replacing the sign bits of the quantized signal samples with an invariable first bit, reads out their absolute values in digital form to a pair of pseudo-correlators PCR' and PCR" having output connections 7' and 7" to memory MEa. Microcomputer MC and memory MEa receive clock pulses from a time base BT also controlling other components of the exchange, including terminal TPCM of FIG. 1. Microcomputer MC has an additional output lead 17 extending to an alarm indicator AL for signaling a malfunction of the receiver as more fully described hereinafter.

Correlator $CR_i$, which is representative of all the other frequency correlators $CR_1-CR_n$, has two parallel signal paths connected between its input 4(i) and its output 6(i), each signal path including a respective multiplier M', M" connected on the one hand to input 4(i) and on the other hand to an associated function generator G' and G" producing a sine function $s_i$ and a cosine function $c_i$ given by $$s_i = \sin 2\pi f_i \cdot rT$$

and $$c_i = \cos 2\pi f_i \cdot rT$$

where $f_i$ is one of the n predetermined signaling frequencies and T is the length of a sampling cycle or PCM frame, r being an integer increasing progressively from one frame to the next. Thus, the output of each function generator is a sequence of numerical values corresponding to the digitized samples of a sine wave of period $1/f_i$ taken at the PCM sampling rate. The products of the generator outputs and the quantized signal sample present in any time slot on input 4(i) are delivered via connections 8 and 9 to respective digital filters F' and F" of identical low-pass characteristics with output connections 10 and 11 extending to a vectorial adder SV.

The output signal y(i) issuing from adder SV in each time slot is fed via connection 6(i) to memory MEa whose cells concurrently store the output signals from the several correlators. A comparison circuit CO in microcomputer MC compares the magnitudes of these output signals with respective thresholds which are stored in cells of memory MEa and are partly derived from the absolute values of the corresponding input signals themselves as modified by one of the two pseudo-correlators, e.g. component PCR'. The internal construction of each pseudo-correlator may be considered similar to that of frequency correlator $CR_i$ except for a replacement of the two function generators G' and G" by a single source of reference parameter of constant numerical value, the reference parameters of the two pseudo-correlators PCR' and PCR" being preferably nearly equal to each other in absolute magnitude but opposite in sign so that their binary output signals, appearing on leads 7' and 7", should differ but slightly. These output signals are integrated over a number $p = K/T$ of frames where K is the time constant of the low-pass filters F' and F" of the pseudo-correlators. That time constant may be about 12 ms, or approximately six times the period of the lowest frequency to be transmitted (540 Hz according to CCITT code R2).

As already noted above, we prefer to utilize for the several correlating elements $CR_1-CR_n$, PCR' and PCR" a single circuit component (except for the local generators G', G") receiving the various trigonometric functions $s_i$, $c_i$ and the aforementioned constant reference parameters in different phases of a time slot, under the control of time base BT. By the same token, the multipliers M', M" and the filters F', F" may be constituted by a single multiplier and a single filter, with connections 10 and 11 (as well as 8 and 9) represented by a single conductor multiple whose bits are stored in circuit SV during a first half of a given phase for vectorial addition to the bits appearing thereon in a second half of that phase. The use of reference parameters of similar magnitudes but opposite signs in the phases assigned to the operation of that circuit component as pseudo-correlators PCR' and PCR" enables a comprehensive testing of the multiplier, filter and adder circuits in each time slot. Any major difference between the absolute magnitudes of the adaptive thresholds emitted by the two pseudo-correlators, if exceeding a critical value, is recognized by the microcomputer MC as a malfunction indication and causes operation of alarm device AL via lead 17.

Figure 4:
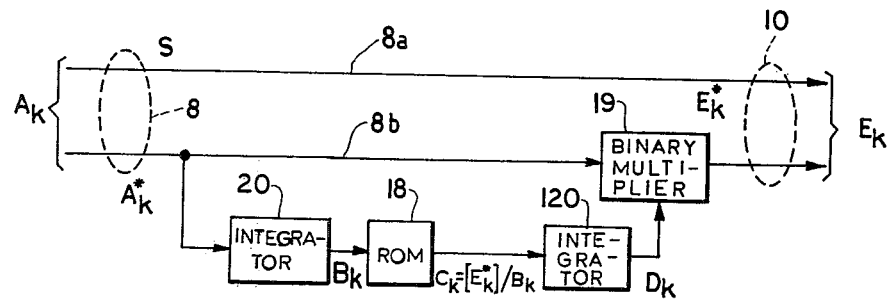
FIGS. 4 and 5 are block digrams showing details of a low-pass filter used in the receiver.

FIG. 4 shows a suitable layout of filter F' (or F'') as described in commonly owned Italian Pat. No. 980,804. A signal $A_k$ appearing in a given time slot on the input multiple 8 of this filter is separated into its sign bit S, carried on a lead 8a of that multiple, and its modulus bits $A^*_k$ carried on a set of leads 8b. A branch of this set of leads extends to an integrator 20, more fully described below with reference to FIG. 5, whose output signal $B_k$ is converted by a circuit 18 into a signal $C_k=[E^*_k]/B_k$ where $[E^*_k]$ is a predetermined mean value with which the input signal $A_k$ is to be compared to yield an output signal $E_k$ on multiple 10. Signal $C_k$ is converted by another integrator 120, identical with circuit 20, into a signal $D_k$ delivered to a binary multiplier 19 which also receives the signal $A^*_k$ directly via the set of leads 8b. The multiplication of the two signals $A^*_k$ and $D_k$ in circuit 19 results in a combination of bits $E^*_k$ which, when combined with the sign bit S arriving over lead 8a, form the outgoing signal $E_k$. Circuit 18 may be a read-only memory, as shown, which emits the reciprocal signal $C_k$ upon being addressed by the signal $B_k$.

Figure 5:
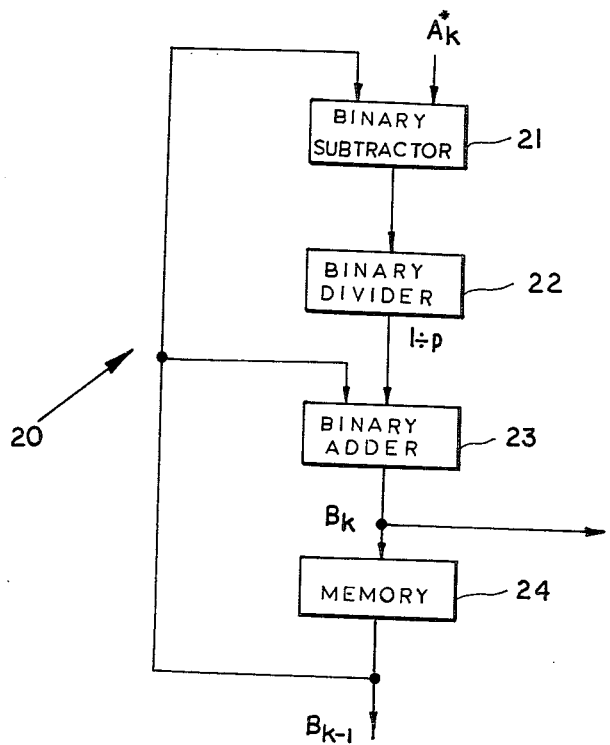

As illustrated in FIG. 5, integrator 20 comprises a binary subtractor 21 receiving on one input the signal $A^*_k$ and on another input the resulting signal $B_{k-1}$ generated in the preceding PCM cycle. Subtractor 21 works into a binary divider 23 in which the difference signal obtained from subtractor 21 is divided by p; with the usual sampling rate of 8,000 frames per second corresponding to $T=125\mu$, and with the time constant K having a value of about 12 ms as given above, $p \approx 100$. If p is made equal to $2^z$, divider 23 may be represented by a simple shift register in which the incoming difference signal is downshifted by z stages. A binary adder 23 receives the signal issuing from divider 22 as well as the feedback signal $B_{k-1}$; the sum of these signals is the signal $B_k$ which on the one hand is transmitted to circuit 18 (FIG. 4) and on the other hand is stored in a memory 24 for subsequent readout, during the next cycle, as the feedback signal $B_{k-1}$.

Figure 2:
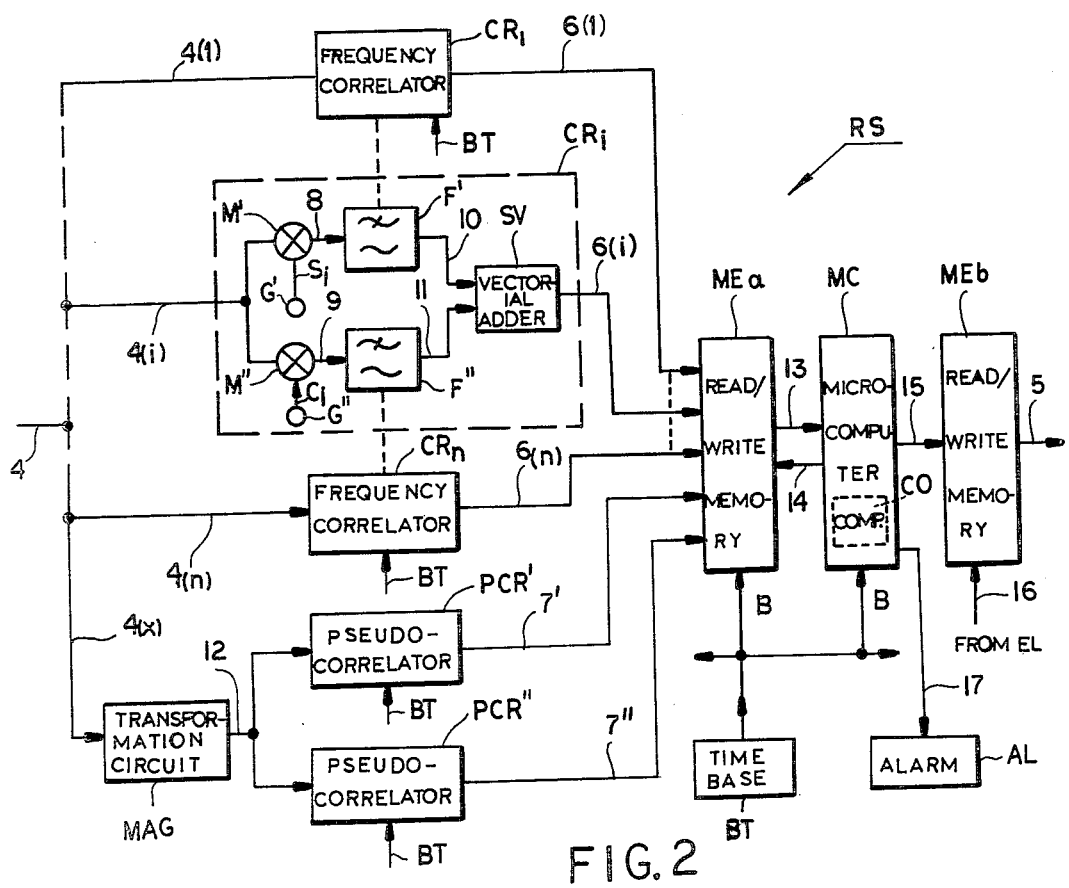
FIG. 2 is a more detailed circuit diagram of the receiver shown in FIG. 1.
Figure 3:
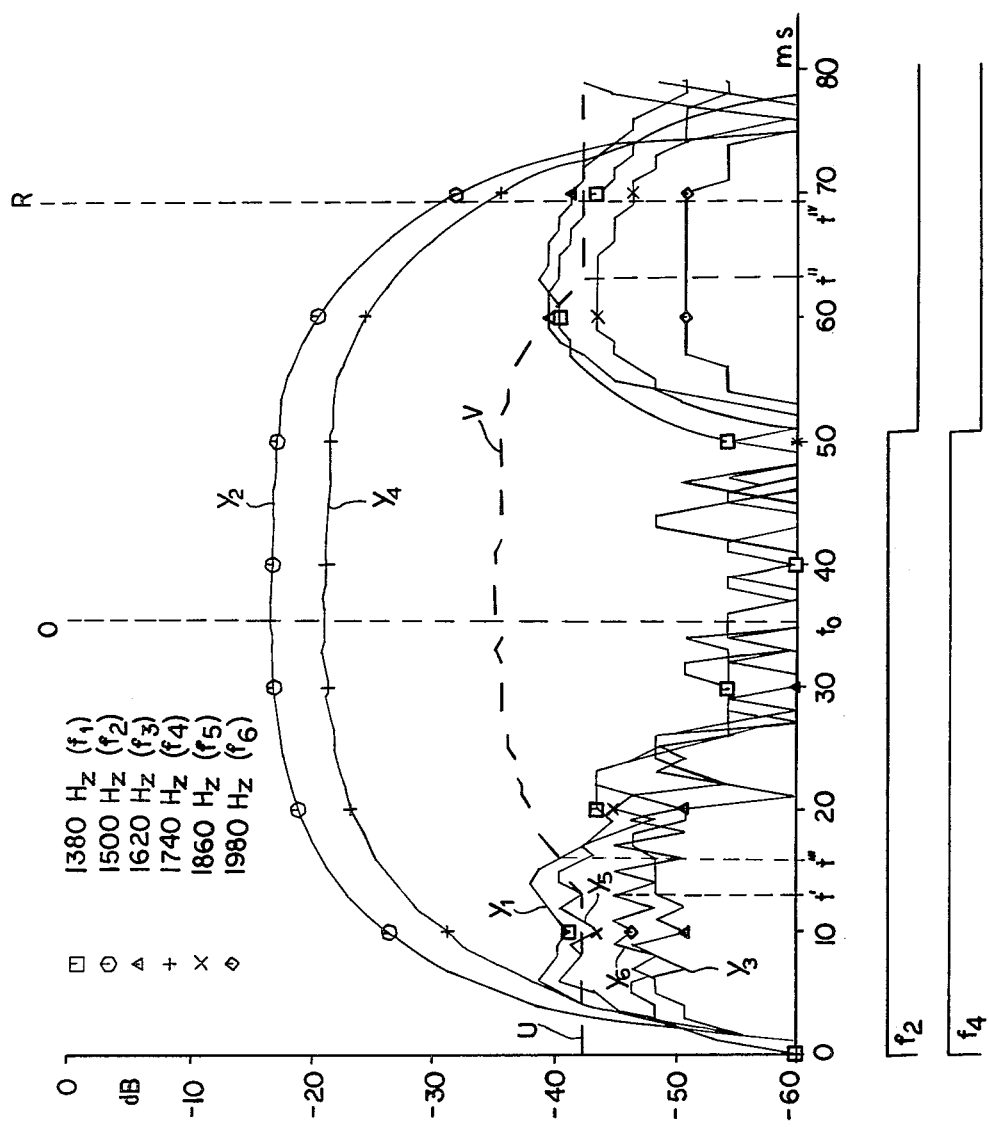
FIG. 3 is a graph serving to explain the operation of our improved receiver.

We shall now describe, with reference to FIG. 3, the operation of our improved receiver RS illustrated in FIG. 2.

With $n=6$ as noted above, curves $y_1-y_6$ represent the envelopes of the several output signals obtained upon correlating the signal samples of a given PCM channel (assigned to one of the links $g_1-g_p$ of FIG. 1) with frequencies $f_1=1380$ Hz, $f_2=1500$ Hz, $f_3=1620$ Hz, $f_4=1740$ Hz, $f_5=1860$ Hz and $f_6=1980$ Hz. It is assumed that the incoming signal sampled in that channel is a pulse P represented by a combination of frequencies $f_2$ and $f_4$, lasting for a period of 50 ms, as shown at the bottom of FIG. 3. The signal level is plotted in decibels against time measured in milliseconds; the base level is at $-60$ dB. A reference level U of $-42$ dB represents a fixed threshold against which the instantaneous signal magnitudes are measured. Output signals $y_2$ and $y_4$, emanating from correlators whose function generators operate at frequencies $f_2$ and $f_4$, rise above that threshold within the first few microseconds, as do output signals $y_1$ and $y_5$. An adaptive threshold V, derived from pseudo-correlator PCR' (FIG. 2), varies as a fraction of the absolute signal level in the channel and starts to exceed the fixed threshold U at a time t' coming about 12 ms after the beginning of the signal pulse.

From this point on until a time $t''=62$ ms, when threshold V again drops below level U, it is this adaptive threshold which is used to discriminate between the actual signaling frequencies $f_2$, $f_4$ and the four other potential signal frequencies.

A logic network in microcomputer MC starts the detection procedure as soon as the amplitudes of two—and only two—correlator outputs exceed the threshold U or V, whichever is greater. In FIG. 3, this condition happens at $t'''=16$ ms. After a predetermined period, e.g. of 20 ms, during which the logic network verifies the persistence of this condition, the reception of a valid signal (here frequencies $f_2$ and $f_4$) is registered. In this instance, a commencement code is written at time $t_0=36$ ms in the output memory MEb, and the values of the effective amplitudes ($y_2$ and $y_4$ at time $t_0$) are stored in memory MEa as criteria to be used in the detection of the termination or release of the detected signal. Specifically, a termination code is entered in memory MEb when the amplitudes of both signal envelopes drop either below one-fourth of their respective values at time $t_0$ or below the threshold previously utilized, as determined by comparison circuit CO. In the example of FIG. 3, the first condition (i.e. a drop by 6 dB) is seen to occur at a time $t^{iv}=69$ ms. The registered parameters (commencement and termination times as well as signal identification) can then be utilized for the control of switching operations in the exchange via processor EL.

It should be noted that our invention is applicable to exchanges in which the incoming signals arrive in analog form and are digitized and sampled at a PCM terminal, as described above, or are already received as digitized samples.

We claim:

1. A method of detecting digitized samples of multifrequency-coded incoming signals received at an exchange of a telecommunication system utilizing a code of m out of n signaling frequencies, comprising the steps of:

correlating each incoming-signal sample with all n signaling frequencies to produce n resulting signals;

evaluating the magnitudes of said resulting signals to determine the m signals whose magnitudes surpass a reference level for at least a predetermined minimum time interval;

storing the magnitudes attained by said m signals at the end of said time interval together with a commencement code identifying said m signals;

comparing the stored magnitudes and said reference level with the instantaneous magnitudes of said m signals in successive sampling cycles to determine the instants when each of said instantaneous magnitudes drops below the higher one of two values respectively represented by said reference level and by a predetermined fraction of the corresponding stored magnitude, said reference level being chosen as the larger one of a fixed threshold and a variable threshold, the latter being proportional to the mean of the absolute values of the incoming-signal samples as averaged over a succession of sampling cycles; and registering a termination code at the last of said instants.

2. A method as defined in claim 1 wherein the correlation step involves multiplying each incoming signal sample with locally generated digital samples of a sine function and of a cosine function of each of said signaling frequencies, separately integrating the resulting digital products over a succession of sampling cycles, and vectorially combining the products so integrated.

3. A method as defined in claim 1 wherein incoming-signal samples from different channels are received in respective time slots assigned to them in a recurrent frame, the multiplication of each incoming-signal sample with said digital samples of each signaling frequency being carried out in successive phases of an assigned slot.

4. A method as defined in claim 3 wherein said variable threshold is generated by multiplying the absolute value of each incoming-signal sample in a further phase of said assigned time slot with a fixed value and integrating the multiplication result over successive recurrences of said frame.

5. A method as defined in claim 4 wherein all multiplications of an incoming-signal sample are performed by one and the same circuit component, further comprising the step of testing said circuit component by multiplying the absolute value of each incoming-signal sample in yet another phase of said assigned time slot with a second fixed value substantially equal in magnitude to the first-mentioned fixed value but of opposite sign, comparing the absolute magnitudes of the digital products resulting from the multiplication of the absolute value of any incoming-signal sample with said fixed values, and generating an alarm signal upon said absolute magnitudes differing by more than a predetermined amount.

6. In an exchange of a telecommunication system wherein digitized samples of multifrequency-coded incoming signals conform to a code of m out of n signaling frequencies, in combination:
   timing means establishing a succession of sampling cycles;
   input means connected to receive digitized incoming-signal samples;
   local generating means for producing digital samples of n oscillations representing said signaling frequencies;
   correlation means connected to said input means and to said local generating means for correlating each incoming-signal sample with all n signaling frequencies to produce n resulting signals;
   source means for producing a reference level;
   evaluating means controlled by said timing means and including comparison circuitry connected to said source means and to said correlation means for determining the m resulting signals whose magnitudes surpass said reference level for at least a predetermined minimum time interval;
   memory means connected to said evaluation means for storing the magnitudes attained by said m resulting signals at the end of said time interval and for registering a commencement code identifying said m resulting signals, said comparison circuitry being adapted to determine the instants when the instantaneous magnitude of each of said m resulting signals drops below the higher one of two values respectively represented by said reference level and by a predetermined fraction of the corresponding stored magnitude, said evaluation means emitting to said memory means a termination code at the last of said instants; and
   output means connected to said memory means for reading out the information stored therein;
   said source means comprising circuit means connected to said input means for deriving from each incoming-signal sample the absolute value thereof, pseudo-correlating means connected to said circuit means for converting said absolute value into a variable threshold proportional to the mean of said absolute value as averaged over a succession of sampling cycles, and a source of a fixed threshold, said comparison circuitry being adapted to select the larger one of said fixed and variable thresholds for comparison with said incoming-signal sample.

7. The combination defined in claim 6 wherein said correlation means comprises multiplication circuitry receiving a sine function and a cosine function for each of said n signaling frequencies from said local generating means, low-pass filter means connected to said multiplication circuitry for separately integrating the resulting digital products, and vectorial adding means for combining the products so integrated.

8. The combination defined in claim 6 wherein incoming-signal samples from different channels are received by said input means in respective time slots assigned to them in a recurrent frame, said correlation means comprising a single circuit component including said multiplication circuitry, filter means and vectorial adding means, said local generating means being controlled by said timing means for feeding sine and cosine functions of said n signaling frequencies during different phases of any time slot to said circuit component.

9. The combination defined in claim 8 wherein said pseudo-correlating means includes said circuit component, said multiplication circuitry being connectable by said timing means to said circuit means for multiplying said absolute value by a fixed value in a further phase of any time slot.

10. The combination defined in claim 9 wherein said multiplication circuitry is connectable by said timing means to said circuit means in yet another phase of any time slot for multiplying said absolute value by a second fixed value substantially equal in magnitude to the first-mentioned value but of opposite sign, said comparison circuitry being connected to receive the absolute magnitudes of the digital products resulting from the multiplication of the absolute value of any incoming-signal sample by said fixed values, further comprising alarm means actuatable by said evaluating means upon said absolute magnitudes differing by more than a predetermined amount.

* * * * *